United States Patent
Sallee et al.

(10) Patent No.: US 6,371,405 B1
(45) Date of Patent: Apr. 16, 2002

(54) OPTICAL SYSTEM FOR LADAR GUIDANCE APPLICATION

(75) Inventors: Bradley Sallee; James Kenneth Vinson, both of Austin, TX (US)

(73) Assignee: BAE Systems Integrated Defense Solutions Inc., Austin, TX (US)

( * ) Notice: Subject to any disclaimer, the term of this patent is extended or adjusted under 35 U.S.C. 154(b) by 0 days.

(21) Appl. No.: 09/432,691

(22) Filed: Nov. 3, 1999

(51) Int. Cl.[7] .......................... F41G 7/20; F42B 15/01
(52) U.S. Cl. .................. 244/3.16; 244/3.15; 244/3.17; 342/54; 342/63
(58) Field of Search ............... 356/4.01, 5, 1, 356/5.11–5.15, 140, 141.1–141.5, 142–149; 340/540–564; 701/200, 207, 223; 244/3.1, 3.13, 3.15–3.22; 342/52–58, 61–65, 175, 176, 179, 189–196

(56) References Cited

U.S. PATENT DOCUMENTS

| | | |
|---|---|---|
| 4,410,237 A | 10/1983 | Veldkamp |
| 4,436,260 A | 3/1984 | Donelan |
| 4,682,024 A | 7/1987 | Halldorsson et al. |
| 4,787,748 A | 11/1988 | Rioux |
| 5,198,919 A | 3/1993 | Reeder |
| 5,283,796 A | 2/1994 | Fink |
| 5,289,493 A | 2/1994 | Fink |
| 5,317,148 A | 5/1994 | Gray et al. |
| 5,345,304 A | 9/1994 | Allen |
| 5,387,996 A | 2/1995 | Palombo |
| 5,477,383 A | 12/1995 | Jain |
| 5,528,354 A | 6/1996 | Uwira |
| 5,543,954 A | 8/1996 | Nicholson |
| 5,644,386 A * | 7/1997 | Jenkins et al. ............. 356/4.01 |
| 5,710,658 A | 1/1998 | Jacobson |
| 5,779,187 A | 7/1998 | Dulat et al. ................ 244/3.16 |
| 5,870,180 A | 2/1999 | Wrangler |
| 5,892,575 A | 4/1999 | Marino |
| 6,042,050 A * | 3/2000 | Sims et al. ................ 244/3.17 |
| 6,163,372 A * | 12/2000 | Sallee et al. ................. 356/5.1 |

\* cited by examiner

Primary Examiner—Bernarr E. Gregory
(74) Attorney, Agent, or Firm—Locke Liddell & Sapp LLP

(57) ABSTRACT

The present invention relates to a system for sweeping a laser beam in a preset pattern, while, at the same time, directing the pattern to any area in a predetermined scanning area. The invention is particularly useful in LADAR applications. In one version of the invention, a series of optical prisms are arranged in concentric tubes so that the prisms have a common optical path. The tubes and, hence, the prisms, may be independently rotated by precision electric motors coupled to gear rings on the tubes.

8 Claims, 4 Drawing Sheets

OPTICAL SYSTEM FOR LADAR GUIDANCE APPLICATION

1. Technical Field of the Invention

The invention relates generally to an optical system for scanning a laser beam. The invention is especially useful in connection with LADAR guidance systems. In particular, the invention relates to an optical system using two pairs of rotating prisms to direct a beam of collimated light, such as laser light into a desired scan area and, simultaneously, to sweep the beam in a predetermined scanning pattern.

2. Background of the Invention

Laser detection and ranging ("LADAR") guidance systems are known in the art. For example, missiles are conventionally provided with a LADAR guidance system used to correct the missile while in route onto a target. In these systems, a laser beam is directed from the missile in a scanning pattern over an area of interest, called the scanning area. The laser light reflected from the scanning area is detected by the missile, which then uses the reflected laser light to generate an image of the scanning area. Computer systems on board the missile identify the target from the image and operate the missile's control surfaces, directing the missile to the target.

Useful guidance systems must have a mechanism for scanning the laser beam in a desired pattern over the scanning area. Conventional mechanisms for LADAR guidance systems typically use fixed speed prisms, gimbals, articulated mirrors, and other optical components to direct and scan the beam. These components are undesirable because they tend to be bulky, delicate, and expensive. Further, current LADAR scanners are either limited to low scan rates, or achieve high scan rates by being limited to a single, fixed scan pattern. The present invention overcomes these disadvantages, and provides further improvements and advantages as will become clear to those skilled in the art in view of the following disclosure.

SUMMARY OF THE INVENTION

One aspect of the invention relates to an LADAR guidance system that can be used to guide a moving vehicle, such as a missile, to a target. In this version of the invention, the optical system includes two pair of optical prisms, a forward pair and a rear pair. The prisms in the forward pair may be positioned with respect to each other to direct the outgoing laser beam, and hence, the scan pattern produced by the rear prisms, in a particular direction relative to the vehicle. The rear pair of prisms may be positioned with respect to each other to move the outgoing laser beam in such a manner that the beam is scanned in a desired pattern. In other words, the rear pair produces the pattern, and the front pair directs or steers the centroid of the pattern to a desired location in the scan area.

In a more specific version of the invention, the optical prisms are arranged in concentric tubes that are mechanically connected to precision motors that rotate the tubes, and hence the prisms, with respect to each other. The precision motors are operated by the vehicle's onboard computer system, which, by rotating the prisms, can scan the beam in any particular pattern onto a desired scan area. This not only allows the use of multiple scan patterns, of any desired size, but also allows the scan patterns to be moved to track moving targets.

In another advantageous version of the invention, the motors controlling the prisms may be connected to other vehicle computer systems to improve performance. For example, it is advantageous to connect the front prisms to the inertial measurement unit, which detects variations in the vehicle's flight path. This allows information from the inertial measurement unit to operate the front prisms so as to cancel out the effects of vehicle vibration and flight variations on the direction of the outgoing laser beam.

DESCRIPTION OF THE PREFERRED EMBODIMENTS

Although details of the invention will be described with respect to its application in a missile guidance system, it is to be understood that its scope is not so limited. The disclosed optical system may be easily adapted by those skilled in the art to guide other vehicles, such as artillery shells, gravity bombs, torpedoes, and ground vehicles toward a target. Similarly, it is easily adapted for use in fixed system in which the guidance system is used to track or analyze information from a target area. This information is then used by other systems for any desired purpose. For example, the optical system is easily mounted to an aircraft, which uses it as a component of a larger LADAR system that tracks other objects moving relative to the aircraft. Still further applications of the inventing will occur to those skilled in the art.

Figure 1:
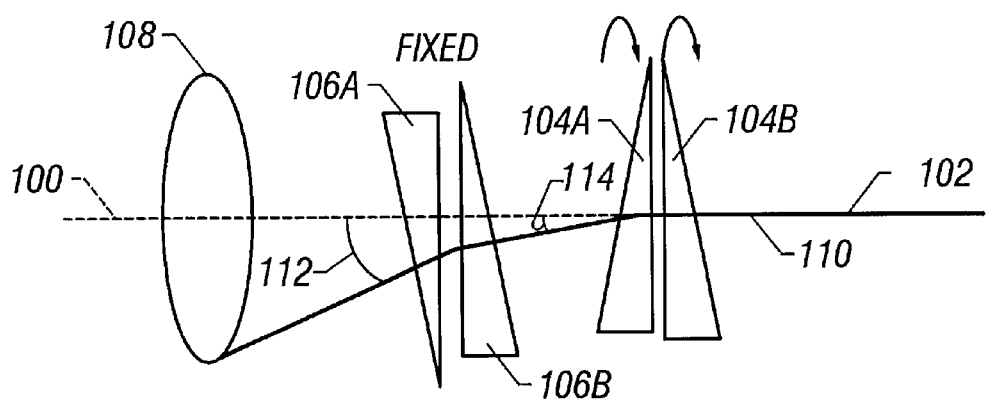
FIG. 1 is a schematic diagram of an optical path according to an embodiment of the invention.

FIG. 1 is a schematic diagram showing the arrangement of the front and rear prisms in the optical path of the optical system according to an embodiment of the invention. A laser (not shown) is positioned to direct a laser beam in the optical path along center line 100. The laser beam 102 is refracted by rear prism 104A, 104B, then front prisms 106A and 106B. In this example, front prisms 106A and 106B are positioned with respect to each other to refract the laser beam 110 at an angle 112 from the center line 100. With the front prisms fixed, as shown, rear prisms 104A and 104B a rotated about the center line 100 which produces a circular scanning pattern 108 of the laser beam 110.

It will be understood that the rear prisms 104A and 104B are fixed with respect to each other in the example shown in FIG. 1, while being rotated about the center line 100.

Figure 2:
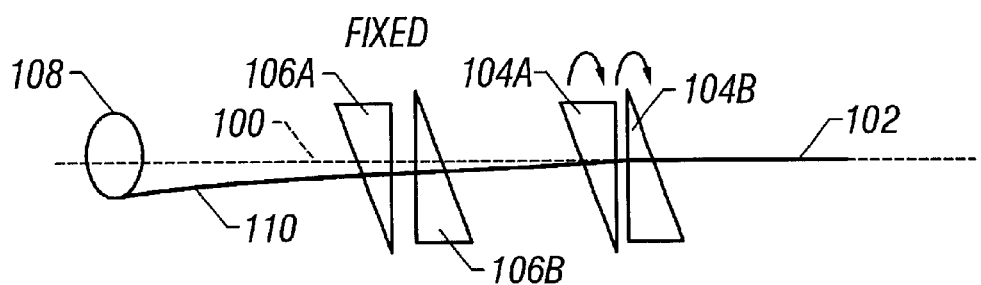
FIG. 2 is a schematic diagram of an optical path according to a further embodiment of the invention.

FIG. 2 is a schematic diagram of an optical path similar to that shown in FIG. 1, except that rear prism 104A is rotated 180° with respect to its position in FIG. 1. Again, front prisms 106A and 106B are fixed, and rear prisms 104A and 104B are fixed with respect to each other, but rotate about the center line 100. This arrangement also produces a circular scanning pattern of the laser beam 110, but the diameter of the circular pattern 108 is smaller than that produced by the arrangement illustrated in FIG. 1. It will be clear to those skilled in the art that rear prisms 104A and 104B can be positioned relative to each other so that the angle 114 is zero. In this case, the beam 110 will not be scanned in a pattern, but will simply project forward along center line 100.

From FIGS. 1 and 2, it will be appreciated that any number of scanning patterns can be produced by rotating rear prisms 104A and 104B with respect to each other. For example, if both prisms are rotated in the same direction about the center line 100, with prism 104A being rotated at a slightly higher speed than prism 104B, angle 114 will be constantly changing with respect to center 100 at a rate proportional to the difference in speed between the two rear prisms. This will, in turn, change the diameter of the scanning pattern 108 and produce a spiral scan about the center line 100. Similarly, the rear prisms could be moved to fixed positions relative to each other to generate other scan patterns. For example, if rear prism 104B is rotated in the opposite direction of rear prism 104A a straight line scan pattern is produced, useful for push-broom style scanning. Numerous other scan patterns can be readily generated by those skilled in the art by manipulating refraction angles 112 and 114 through control of the relative positions of the prisms in the optical path.

The motors connected to the rear scanning prisms are preferably high speed and, thus, low acceleration motors, turning, for example, up to 10,000 RPM. The front scanning prisms are coupled to motors that preferably have high gear ratios to allow fast acceleration. The motors that control the front prisms can typically accelerate from 0° to 180° prism rotation, and stop within 30 milliseconds or less. This allows rapid manipulation of the scan pattern centroid to compensate for airborne turbulence. In one embodiment, the resolvers are used that can detect prism position to 0.005° accuracy while running at full speed.

Figure 3:
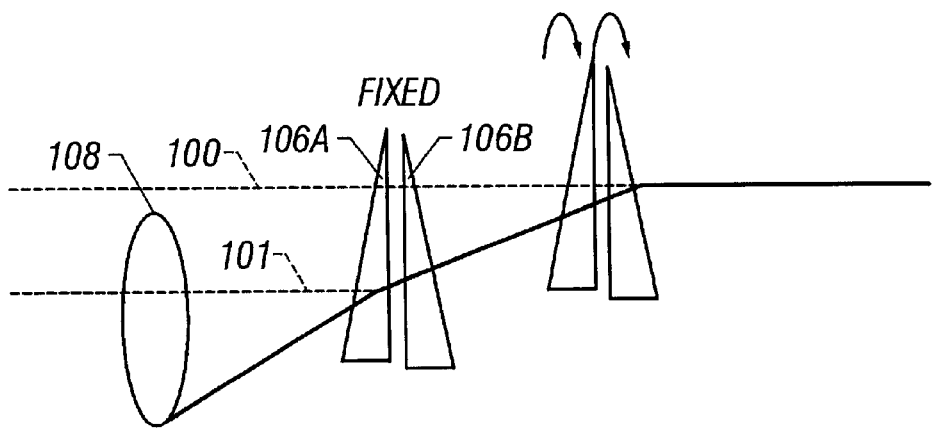
FIG. 3 is a schematic diagram of an optical path according to still a further embodiment of the invention.

Referring now to FIG. 3, the prisms in the optical path are manipulated according to a further embodiment of the invention. In this case, front prism 106A is rotated 180° with respect to front prism 106B from its position shown in FIG. 1.

By arranging the front prisms as shown, the center line of the laser beam is effectively shifted to create a new center line 101. When new prisms 104 and 104B are rotated in a manner to create a circular or spiral scan pattern, the pattern 108 is now centered about the shifted center line 101. The entire pattern, thus, has been moved in space. This allows the guidance system to shift the pattern in space to track a moving object, while at the same time, retaining the ability to control the shape and size of the scan pattern itself.

Figure 4:
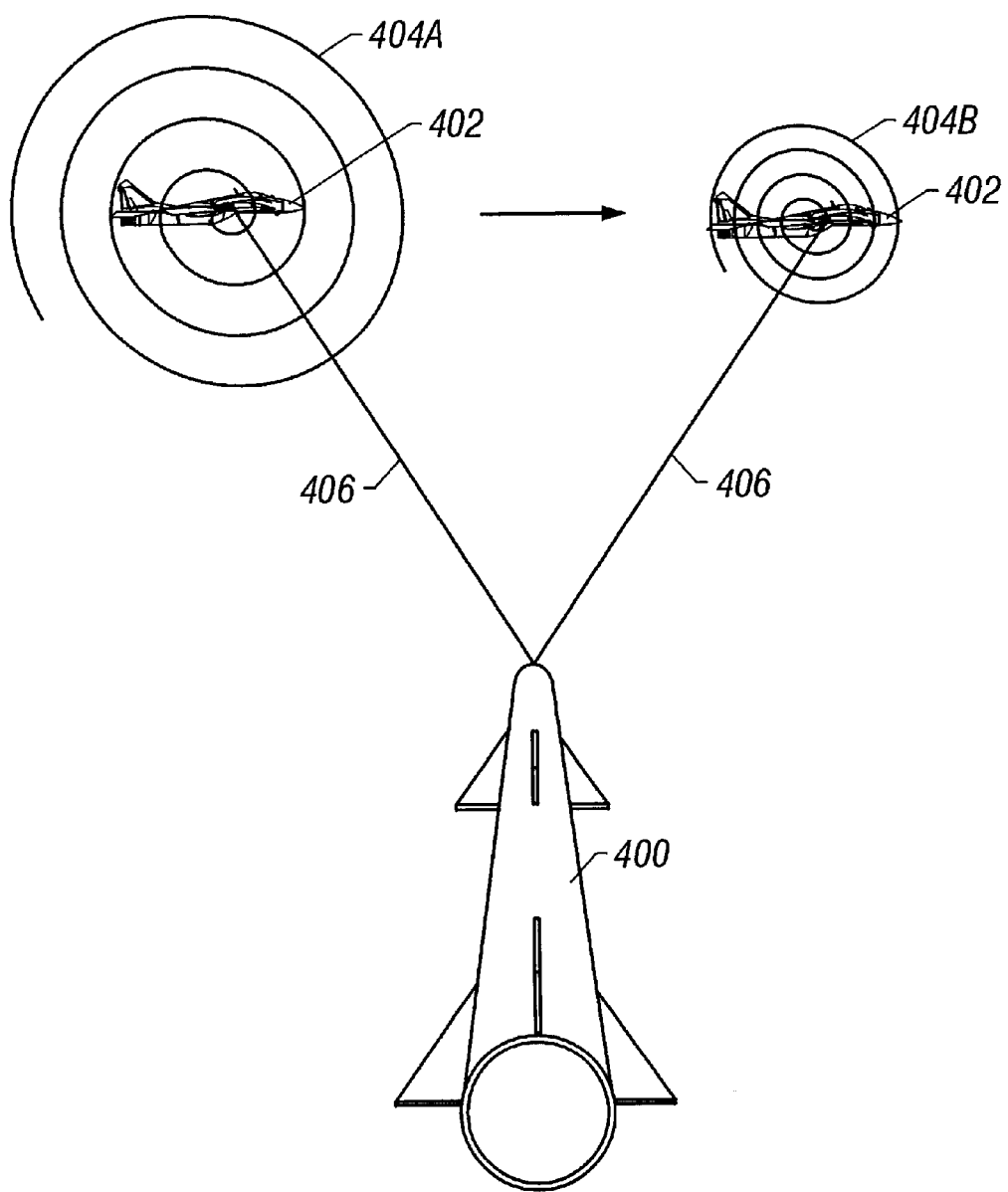
FIG. 4 is a diagram illustrating the use of the present invention to change the size of the scanning problem while moving the pattern in space.

For example, FIG. 4 shows one way in which the guidance system's ability to move the scanning pattern, while simultaneously controlling the scan pattern, shape and size is used. In this case, a missile 400 is launched at a target aircraft 402. The target aircraft is moving from left to right across the missile's field of view. Initially, the missile 400 searches the target area with a large circular scan pattern 404 generated by outgoing laser beam 406. When the onboard computer identifies the moving target 402, it operates the prisms in a manner to sweep the scan pattern 404 from left to right so as to track the target aircraft 402. At the same time, the rear prisms are operated to shrink the scan pattern 404 to a smaller, more precise scan 404B that is useful to more accurately track the target 402. Of course, the scan pattern can be changed to any size or shape, as is desired, as the beam 406 is moved from left to right to maintain contact with the target.

Figure 5:
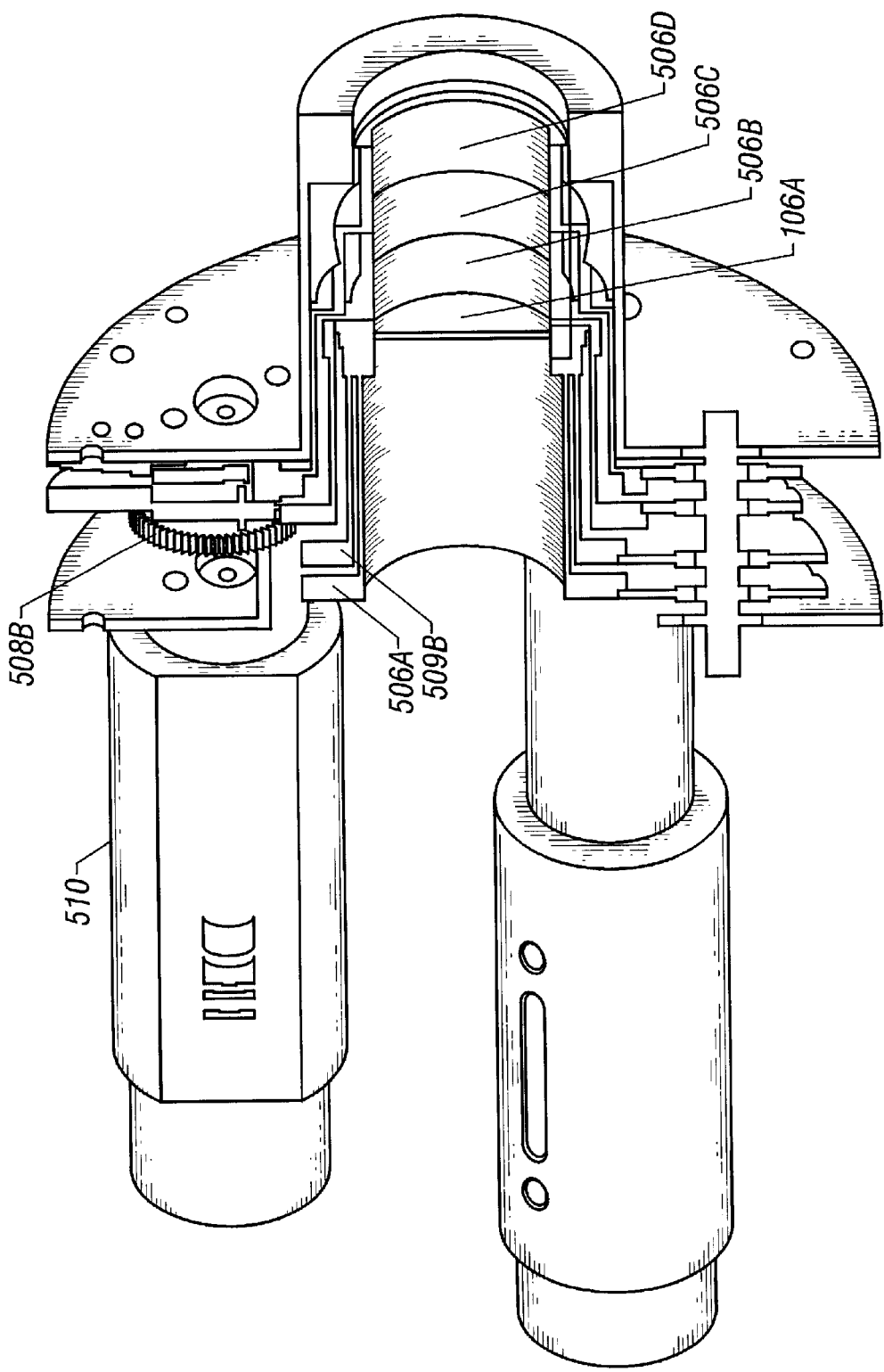
FIG. 5 is a cut-away diagram of an apparatus for operating the optical prisms according to an embodiment of the invention.

FIG. 5 is a cut-away diagram of an apparatus according to an embodiment of the invention that mechanically operates the front and rear prisms. Each prism is housed in a tubular sleeve which can be rotated by a precision electrical motor. The tubes are concentrically arranged to create the optical path formed by the prisms. Thus, sleeve 506A houses front prism 106A, sleeve 506B houses front prism 506B, and so forth. The base section of each tube is fitted with a gear ring that meshes with a drive gear operated by the precision electric motor. For example, gear 508B meshes with the gear ring 509B of optical tube 506B. When the precision electric motor 510 drives gear 508B, it rotates the tube 506B, and hence the optical prism 106B. It is advantageous to allow each tube to be driven independently of the others. This allows the system to have the maximum flexibility in terms of scan patterns and movement of the scan pattern in space. Resolvers (not shown) are also connected to either the back of the motors or directly to the ring gears. These measure the position of the prisms and feed this to the controlling computer. In one embodiment, rare earth magnet D.C. servo-motors are used to control the prisms because they allow smooth motion control and extremely high acceleration.

Figure 6:
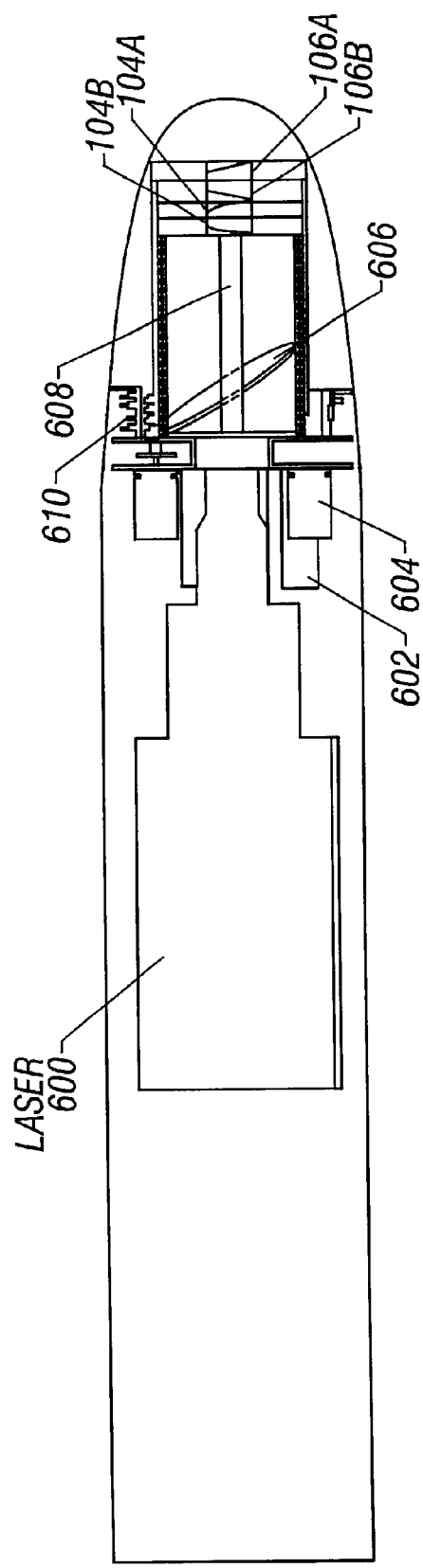
FIG. 6 is a cross-section of a missile equipped with a LADAR guidance system according to an embodiment of the invention.

Another embodiment of the invention is shown in FIG. 6. This figure is a cutaway diagram of a guided missile equipped with a LADAR guidance system according to a version of the invention. The scanning prism arrangement shown is identical to that described above. In this design, however, the same optical path is used for both the laser transmission (outgoing) and the telescope and laser detection of the incoming or reflected radiation from the target. More specifically, the optical path in this embodiment includes a laser 600 that projects a beam through optical tube 608, into the prisms 104A, 104B, 106A and 106B, and out into the scanning area. The prisms are circular in cross-section and each is attached to the end of a concentric tube that is driven by gearing 610 as described earlier. The gearing is, in turn, driven by precision motors, such as motor 602. The position of the prisms are determined by means of resolvers, such as resolvers 604. The exact method of determining the positions of the prisms, or manipulating their positions relative to one another is not critical as long as adequate resolution for the intended purpose is achieved. Other suitable methods will occur to those of skill in the art who, as a matter of design choice, will take into account the speeds of the vehicle and the targets it is intended to track, the size of the intended targets, the size of the desired scanning area, the overall cost of the system, and other known factors.

As will be understood by those of skill in the art, telescopes are typically used in LADAR optical systems to gather and focus the incoming laser light. See, for example, U.S. patent application Ser. No. 09/432,994, filed Nov. 2, 1999, entitled Multi-Spectral Imaging LADAR, in the names of Bradley Sallee and Joe Gleave, incorporated herein by reference now U.S. Pat. No. 6,302,355. The placement of the telescope in the optical path is a matter of design choice. By using the same optical path for both transmitting and receiving the laser lights, the scanning prism set makes the transmit and receive directions collinear, allowing a high-gain, low field of view telescope to be used on the receiver.

Although the present invention has been described with respect to specific embodiments, it is to be understood that these are provided by way of illustration only and are not intended to limit the scope of the invention. Variations and adaptations of the invention will occur to those of skill in the art without departing from the scope and spirit of the present invention.

What is claimed is:

1. An optical system for positioning a laser beam comprising:
   a device for generating a laser beam;
   a first pair of optical prisms;
   a second pair of optical prisms positioned along a common center line with the first pair of optical prisms;
   a mechanism that rotates each optical prism independently so that a laser beam transmitted along the common center line is directable to any point in a scanning area.

2. An optical system as in claim 1 wherein the mechanism comprises a series of concentric tubes, with one prism housed in each tube.

3. An optical system as in claim 1 wherein each tube is provided with a gear ring to interface with a drive gear coupled to a precision positioning motor.

4. A LADAR guidance system comprising:
   a laser;
   an optical system for directing the path of a beam generated by the laser, the optical path including:
   a first pair of optical prisms on the upstream side of the optical path;
   a second pair of optical prisms on the downstream side of the optical path;
   a mechanism for rotating each optical prism independently.

5. A LADAR guidance system as in claim 4 further comprising a plurality of concentric tubes, each tube housing one of the optical prisms.

6. A LADAR guidance system as in claim 4 further comprising a pair of precision motors that rotate the tubes housing the optical prisms.

7. A LADAR guidance system as in claim 4 wherein the reflected energy from the transmitted beam is received along the same optical path used the transmit the beam.

8. A LADAR guidance system as in claim 4 wherein one set of prisms is connected to a drive mechanism moves at a high-speed operation and the other set is connected to a drive mechanism that moves at a high acceleration from one fixed angle to another fixed angle.

* * * * *